United States Patent
Sarikaya

(10) Patent No.: US 8,385,249 B2
(45) Date of Patent: Feb. 26, 2013

(54) APPARATUS AND METHOD FOR BASIC MULTICAST SUPPORT FOR PROXY MOBILE INTERNET PROTOCOL VERSION SIX (IPV6)

(75) Inventor: Behcet Sarikaya, Wylie, TX (US)

(73) Assignee: Futurewei Technologies, Inc., Plano, TX (US)

(*) Notice: Subject to any disclaimer, the term of this patent is extended or adjusted under 35 U.S.C. 154(b) by 333 days.

(21) Appl. No.: 12/754,069

(22) Filed: Apr. 5, 2010

(65) Prior Publication Data

US 2010/0265869 A1     Oct. 21, 2010

Related U.S. Application Data

(60) Provisional application No. 61/170,371, filed on Apr. 17, 2009.

(51) Int. Cl.
*H04B 7/00* (2006.01)
(52) U.S. Cl. ......... 370/312; 370/338; 370/390; 370/432
(58) Field of Classification Search ............... 370/312, 370/328–338, 390, 432
See application file for complete search history.

(56) References Cited

U.S. PATENT DOCUMENTS

| | | | | |
|---|---|---|---|---|
| 2008/0084847 A1* | 4/2008 | Xia et al. | ...... | 370/331 |
| 2010/0167741 A1* | 7/2010 | Lee | ...... | 455/436 |
| 2011/0216680 A1* | 9/2011 | Vogt et al. | ...... | 370/310 |

FOREIGN PATENT DOCUMENTS

| | | |
|---|---|---|
| CN | 101399745 A | 4/2009 |
| WO | 2008138440 A2 | 11/2008 |
| WO | 2008146810 A1 | 12/2008 |

OTHER PUBLICATIONS

Sarikaya, B., "Proxy Mobile IPv6 Basic Multicast Support Solution," draft-sarikaya-multimob-pmipv6-basic-mcast-support-01.txt, Mar. 15, 2010.
Wakikawa, R., et al., "IPv4 Support for Proxy Mobile IPv6," draft-ietf-netlmm-pmip6-ipv4-support-18.txt, Feb. 2010.
Bradner, S., "Key Words for Use in RFCs to Indicate Requirement Levels," BCP 14, RFC 2119, Mar. 1997.
Perkins, C., "IP Mobility Support for IPv4," RFC 3344, Aug. 2002.
Johnson, D., et al., "Mobility Support in IPv6," RFC 3775, Jun. 2004.
Vida, R., et al., "Multicast Listener Discovery Version 2 (MLDv2) for IPv6," RFC 3810, Jun. 2004.
Kempf, J., "Goals for Network-Based Localized Mobility Management (NETLMM)," RFC 4831, Apr. 2007.
Gundavelli, S., et al., "Proxy Mobile IPv6," RFC 5213, Aug. 2008.

(Continued)

*Primary Examiner* — Pao Sinkantarakorn
(74) *Attorney, Agent, or Firm* — Conley Rose, P.C.; Grant Rodolph; Brandt Howell

(57) ABSTRACT

An apparatus comprising a mobile access gateway (MAG) configured to receive a tunneled multicast packet from a local mobility anchor (LMA), decapsulate the tunneled multicast packet, and forward the multicast packet to a mobile node (MN). A network component comprising at least one processor configured to implement a method comprising receiving a request message tunneled by a MAG for a MN, wherein the request message indicates that the MN wants to join a multicast group, decapsulating the tunneled message, connecting to a router for the multicast group, receiving a multicast packet from the router, and sending a tunneled multicast packet to the MN via the MAG, wherein the tunneled multicast packet has at least three Internet Protocol (IP) layer or layer 3 headers.

18 Claims, 5 Drawing Sheets

OTHER PUBLICATIONS

"Living List: IPTV Service Scenarios," Focus Group on IPTV, FG IPTV-DOC-0135, International Telecommunication Union—Telecommunication Standardization Sector, Geneva, Jul. 23-31, 2007.

Sarikaya, B., "Proxy Mobile IPv6 Basic Multicast Support Solution," draft-sarikaya-multimob-pmipv6-basic-mcast-support-00.txt, May 2009.

Wakikawa, R., et al., "IPv4 Support for Proxy Mobile IPv6," draft-ietf-netlmm-pmip6-ipv4-support-11.txt, Apr. 8, 2009.

Foreign Communication From a Related Counterpart Application, PCT Application PCT/CN2010/071813, International Search Report dated Jul. 22, 2010, 4 pages.

Foreign Communication From a Related Counterpart Application, PCT Application PCT/CN2010/071813, Written Opinion dated Jul. 22, 2010, 7 pages.

\* cited by examiner

APPARATUS AND METHOD FOR BASIC MULTICAST SUPPORT FOR PROXY MOBILE INTERNET PROTOCOL VERSION SIX (IPV6)

CROSS-REFERENCE TO RELATED APPLICATIONS

The present application claims priority to U.S. Provisional Patent Application No. 61/170,371 filed Apr. 17, 2009 by Behcet Sarikaya and entitled "Basic Multicast Support for Proxy Mobile IPv6," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standard, Wireless Fidelity (WiFi) based on IEEE 802.11 standard, Worldwide Interoperability for Microwave Access (WiMAX) based on IEEE 802.16 standard, 3GPP based on Long Term Evolution (LTE) Radio Access Network (RAN), and Wideband Code Division Multiple Access (WCDMA) RAN. A proxy mobile IPv6 (PMIPv6) protocol allows a mobile node (MN) to avoid handling its own mobility management. Instead, the mobility management of the mobile device can be handled by a mobile access gateway (MAG) and/or a local mobility anchor (LMA), e.g. in the access network. However, specific mechanisms for IPv6 to meet some technology requirements have not yet been developed. For example, the MAG is not configured to support multicast routing to support IP multicast applications for mobile users. Multicast routing is needed to provide IP wireless broadband services, such as mobile IP television (IPTV), point-to-multipoint push-to-talk applications, content broadcasting and streaming, video conferencing, multiplayer gaming, mobile chatting or messaging, group file transfer, and other similar applications.

SUMMARY

In one embodiment, the disclosure includes an apparatus comprising a MAG configured to receive a tunneled multicast packet from a LMA, decapsulate the tunneled multicast packet, and forward the multicast packet to a MN.

In another embodiment, the disclosure includes a network component comprising at least one processor configured to implement a method comprising receiving a request message tunneled by a MAG for a MN, wherein the request message indicates that the MN wants to join a multicast group, decapsulating the tunneled message, connecting to a router for the multicast group, receiving a multicast packet from the router, and sending a tunneled multicast packet to the MN via the MAG, wherein the tunneled multicast packet has at least three IP layer or layer 3 headers.

In yet another embodiment, the disclosure includes a method comprising receiving a request message from a MN to join a multicast group, tunneling the request message to a LMA, receiving a tunneled multicast packet from the LMA that is destined for the MN, decapsulating the tunneled multicast packet to obtain a unicast packet comprising multicast content, and sending the multicast packet to the MN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for enabling multicast routing in PMIPv6, e.g. to support mobile IPTV and/or other IP multicast applications and provide seamless user mobility. PMIP multicast routing may be supported between a MN and a LMA using a MAG, and the bi-directional tunnel between the MAG and the LMA. Specifically, the MN may subscribe to a multicast group by sending a Multicast Listener Discovery (MLD) message to the MAG, which tunnels the MLD message to the LMA. Upon receiving the MLD message from the MAG, the LMA may join the multicast group and maintain a multicast state for the MN. When the LMA receives a multicast packet, the LMA may duplicate the multicast packet so that there is one copy of the multicast packet for each MN subscribed to the multicast group. The LMA may also encapsulate each packet with a unicast header associated with one of the subscribed MNs. The unicast packets may then be encapsulated a second time with a tunnel header and tunneled to the MAG. The MAG may remove the tunnel and unicast headers and send the multicast packets to the subscribed MNs. In the case of a handover, the MN may communicate with a second MAG, which notifies the LMA of the handover. As such, the LMA may continue to receive the multicast packets but redirect the multicast packets to the second MAG, which may forward the multicast packets to the MNs. IPv4 support for the PMIP multicast method is also provided.

Figure 1:
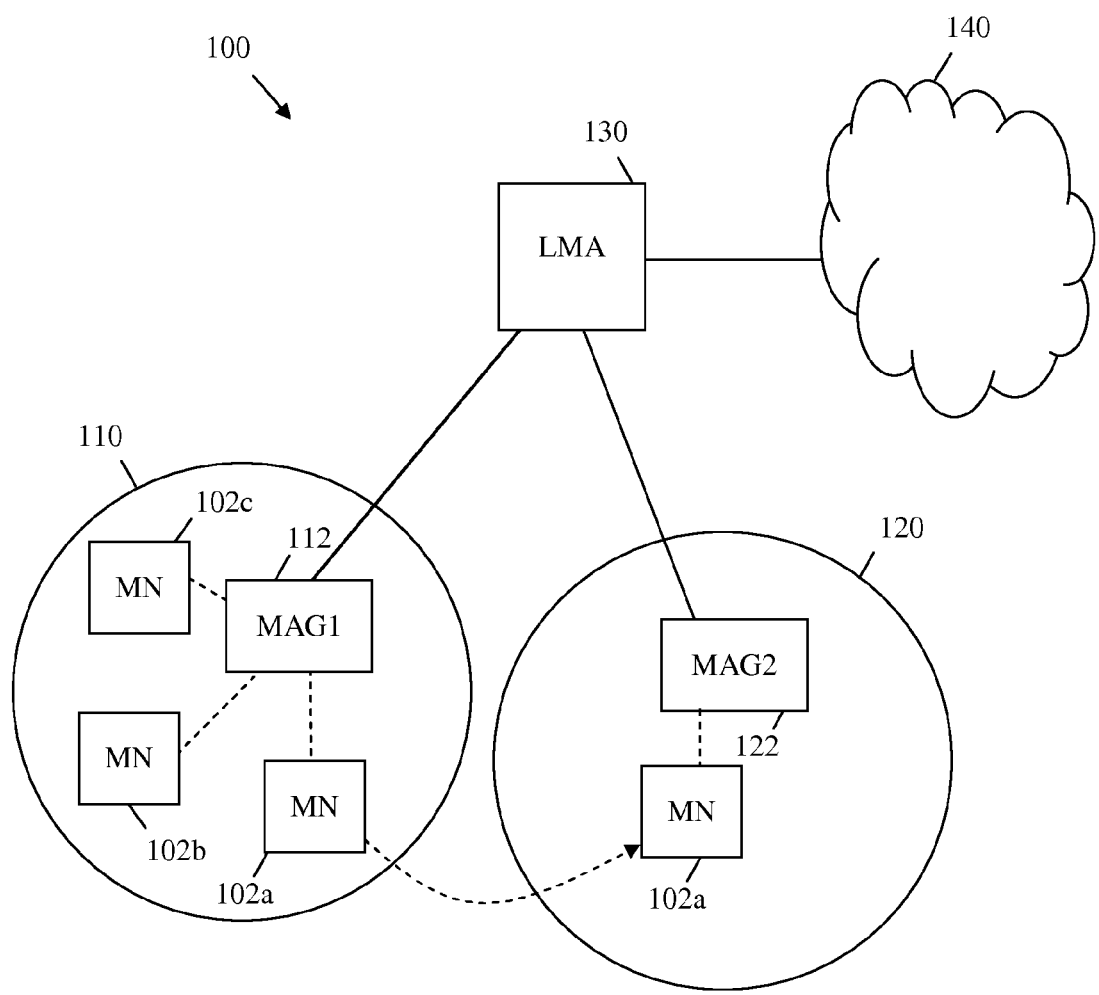
FIG. 1 is a schematic diagram of one embodiment of a wireless access network system.

FIG. 1 illustrates an embodiment of a wireless access network system 100, which may support PMIPv6 multicast routing. The wireless access network system 100 may comprise a plurality of MNs 102a, 102b, and/or 102c (collectively MNs 102), a first MAG 112 (MAG1) in a first wireless access network 110, a second MAG 122 (MAG2) in a second access network 120, a LMA 130, and a network 140. The MNs 102 may be located within the first wireless access network 110 coverage area. As such, the MNs 102 may communicate with the first MAG 112 via wireless connections. Any of the MNs 102, e.g. MN 102a, may relocate to the second access network 120 coverage area, and as such may communicate with the second MAG 122 via a wireless connection. In addition, the first MAG 112 and the second MAG 122 may independently establish connections and communicate with the LMA 130. Such a configuration allows the MNs 102 in the first access network 110 and the second access network 120 to communicate with each other and the network 140.

In an embodiment, the MNs 102 may be any mobile device that uses the first wireless access network 110 to communicate with another MN 102 and/or with the network 140. Specifically, the MNs 102 may be a mobile user-oriented device that communicates with a second MN 102 and/or the network 140 via first MAG 112, the second MAG 122, and/or the LMA 130. For example, each MN 102 may be a cellular telephone, a notebook computer, a personal digital assistant (PDA), or any other wireless device. Alternatively, some MNs 102 may be fixed communications devices, such as desktop computers or set top boxes, which may be connected to the first MAG 112 or the second MAG 122 using wireless technology. In addition, some MNs 102 may be IP hosts or routers whose mobility is managed by the wireless access network system 100. Specifically, the MNs 102 may be IPv4-only nodes, IPv6-only nodes, or a dual-stack nodes, and may not be required to participate in any IP mobility related signaling for achieving mobility for an IP address that is obtained in that PMIPv6 domain.

In an embodiment, the first MAG 112 and the second MAG 122 may be any devices or components configured to handle mobility management for the MNs 102, e.g. based on the PMIPv6 protocol. PMIPv6 is described in the Internet Engineering Task Force (IETF) Request for Comments (RFC) 5213, which is incorporated herein by reference as if reproduced in its entirety. For example, the first MAG 112 and the second MAG 122 may be access routers or access gateways that provide access between the MNs 102 and/or the network 140. In an embodiment, the first MAG 112 and the second MAG 122 may manage the mobility-related signaling for any MNs 102 that are attached to their access links. The first MAG 112 and the second MAG 122 may be responsible for tracking the MNs' movements to and from the access link and for signaling such to the LMA 130. In an embodiment, the first MAG 112 and the second MAG 122 may maintain a Binding Update List (BUL), which may be a data structure that keeps correspondent registrations for other MAGs.

In an embodiment, the LMA 130 may be any device or component that provides connectivity and/or external access to the MNs 102 via the first MAG 112 and/or the second MAG 122. The LMA 130 may be configured to support the PMIPv6 protocol, and may be the home agent (HA) for the MN 102 in a PMIPv6 domain. Specifically, the LMA 130 may be the topological anchor point for the MNs' home network prefix(es), and may be the entity that manages the MNs' binding state. The LMA 130 may maintain a Binding Cache, which may be a cache of mobility bindings for the MNs 102 that may be used for sending or forwarding messages to the MAGs 112, 122 serving the MNs 102. In addition, the LMA 130 may have the functional capabilities of a HA as defined in IETF document RFC 3775, which is incorporated herein by reference, and may have additional capabilities required for supporting PMIPv6 as defined in RFC 5213.

The network 140 may be any network that provides services to the MNs 102 via the first wireless access network 110 and/or the second access network 120. For instance, the network 140 may be a private network, a public network, an intranet, the Internet, or combinations thereof. The network 140 may provide to the MN 102s upstream and/or downstream IP packets, such as IPv6 packets, that may comprise data, text, voice, video, and/or any other services. Alternatively, such packets may be exchanged between the MNs 102. The packets may be part of an IPv6 flow that may be identified by a source IP address, a destination IP address, a transport protocol number, a source port number, a destination port number, or combinations thereof. The services directed by the LMA 130 to the MNs 102, via the first MAG 112 or the second MAG 122, may comprise multicast services, such as IPTV multicast packets.

Figure 2:
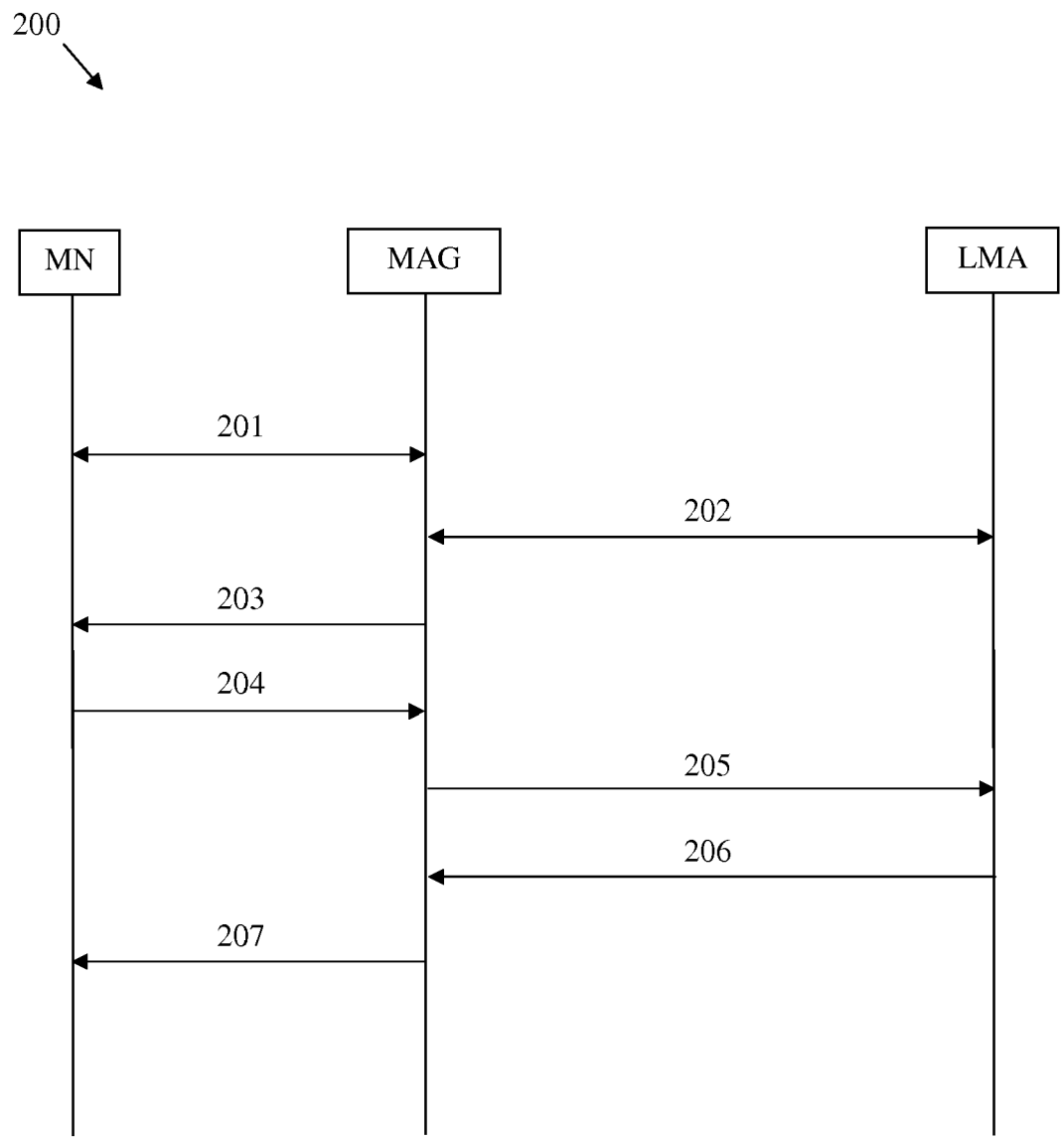
FIG. 2 is a protocol diagram of an embodiment of a proxy mobile IP (PMIP) multicast method.

FIG. 2 illustrates one embodiment of a PMIP multicast method 200, which may provide multicast services for a MN, such as the MN 102a. Initially, the MN may activate an interface in a local wireless network, such as the first wireless access network 110. At step 201, the MN may establish a link or attachment between the interface and a MAG in the local wireless network. At step 202, the MAG may complete a proxy binding update (PBU)/proxy binding acknowledgement (PBA) message exchange with a LMA, e.g. upon detecting the link with the MN. The LMA may be configured to connect the local wireless network to a provider network. Upon receiving the PBU message, the LMA may assign a prefix for the MN using the PBA message, which may be sent from the LMA to the MAG. The MAG may obtain the assigned prefix from the PBA message and advertise it to the MN. Specifically, the MAG may send the prefix to the MN in a PBA message at step 203. Thus, the MN may receive the assigned prefix and use the prefix to configure its address, e.g. using stateless address configuration based on RFC 4862, which is incorporated herein by reference.

The MN may need to be MLD version 2 (MLDv2)-capable to receive the multicast packet from a multicast group. For instance, when the MN function (e.g. an application) needs to join a multicast group to receive a multicast service (e.g. IPTV), the MN may initiate a join socket call. The call may trigger the MLDv2 protocol layer to send a multicast listener report message to the MAG. The source address of the MLDv2 report message may be the MN's link-local address, and the destination address of the message may be set to FF02:0:0:0:0:0:0:16 to indicate a MLDv2-capable router group address.

At some point, the MN may need to join a multicast group to receive a multicast service, and hence the MN may send a MLD message to the MAG at step 204. The MLD message may be a MLD version 2 (MLDv2) protocol report message as described in RFC 3810, which is incorporated herein by reference as if reproduced in its entirety. The MN may use the address associated with its interface or link, e.g. link-local address, as a source address in the MLD message, and optionally in any subsequent MLD message. In an embodiment, the MAG may register the MN to the LMA before receiving the first MLDv2 message from the MN, e.g. after establishing a link with the MN. The PMIPv6 protocol may ensure that the link-local address assigned to the MN is unique to the point-to-point link between the MN and the MAG. Additionally, according to the PMIPv6 protocol, the MN may be registered with the LMA, using PBU/PBA exchange, before the MN completes a Duplicate Address Detection (DAD) operation, e.g. based on RFC 5213. The MN may send the MLDv2 report message after performing the DAD operation.

At step 205, the MAG may tunnel the MLD message to the LMA, e.g. by encapsulating the packet and sending the packet to the LMA. According to the PMIPv6 specification in RFC 5213, the MAG may not forward to the LMA packets that comprise link-local source addresses to support a DAD protocol. To allow the LMA and the MAG to exchange MLDv2 packets, the MAG may be allowed to forward MLDv2 packets comprising link-local source addresses to the LMA. Specifically, the source address in the MLDv2 packet may indicate the link-local address of the MN. The MAG may tunnel the MLDv2 packet received from a MN on an access link between the MN and the MAG. The tunneled MLDv2 packet may comprise an IP destination address, e.g. FF02:0:0:0:0:0: 0:16, which may indicate a MLDv2-capable router group address. As such, the MLDv2 packet may be forwarded on the bi-directional tunnel between the MAG and the LMA, which may be a MLDv2-capable router. The LMA may receive the encapsulated MLD message from the MAG, decapsulate the MLD message, and join the multicast group requested by the MN. For instance, the LMA may connect to a multicast tree for the multicast group via an upstream router and set up a multicast state for the MN.

In an embodiment, the LMA may be configured to maintain a multicast listening state per multicast address, e.g. based on the MLDv2 protocol. The MLDv2 protocol may be implemented between the MN, which may be the multicast address listener, and the LMA, which may be the multicast router. For instance, the LMA may be a MLDv2 node configured to keep track of a plurality of multicast sources for multicast services, e.g. for different multicast groups. This multicast listening state configuration may allow a simple forwarding scheme of the multicast services from the multicast sources to the MN(s), e.g. downstream. The LMA may send periodic queries to the MNs to receive information about the MNs, such as a group membership for a plurality of MNs. Since PMIPv6 may support a per-MN prefix model, the LMA may exchange a plurality of query messages and/or report messages with each MN using a corresponding address and link for the MN. As such, each different multicast source or group may provide a multicast service for each MN on a corresponding point-to-point link, e.g. between the MAG and the MN.

A multicast group may also provide a multicast service for a plurality of MNs. The LMA may maintain a multicast membership status state for the MNs, for instance by maintaining a plurality of records in the form: {IPv6 multicast address, receiver list}. Each record may associate a list of receivers, e.g. MN addresses with a multicast address that corresponds to a multicast group or source. For example, the receiver list may comprise a plurality of link-local addresses for the MNs that may be members of the multicast group, and because of this, the link-local addresses that the MNs generate must uniquely identify each MN.

In an embodiment, when the LMA receives the multicast packet, e.g. from an upstream multicast router (MR) for the multicast group, the LMA may search the multicast membership status state for the source multicast address. For instance, for each receiver, the LMA may search the binding cache entry to find a match to the link-local source address. Since the MAG may not be configured to support multicast routing, the MAG may not be able to forward multicast packets from the LMA to the MN. Thus, the LMA may duplicate a multicast packet for each MN subscribed to the multicast group and encapsulate the packets with a unicast header. The encapsulated multicast packets may comprise a destination address that may correspond to the subscribed MN in each duplicate packet, e.g. a MN home address (MN-HoA). The packets may then be encapsulated a second time with a tunnel header for transmission via the LMA-MAG tunnel. Specifically, the tunneled packets may comprise a destination address that may correspond to the MN's MAG, e.g. the MN's proxy care-of-address (Proxy-CoA). At step 206, the LMA may send the twice encapsulated multicast packet to the MAG, e.g. via the bi-directional tunnel between the LMA and the MAG. For example, if the MN 102a and the MN 102b, but not the MN 102c, subscribe to a multicast group, the LMA 130 may forward the multicast packets to the MN 102a and the MN 102b, but not to the MN 102c.

At the step 207, the MAG may decapsulate both encapsulation layers from each multicast packet, and forward each packet to a corresponding MN that matches the destination address in the unicast header. Specifically, when the MAG receives an encapsulated multicast packet from the LMA, the MAG may decapsulate the multicast packet by first removing the outer header. The MAG may then detect an inner header in the packet, e.g. the unicast header, and remove the inner header. The MAG may forward the decapsulated multicast packet to the link or interface connected to the MN and associated with the destination address in the inner (e.g. unicast) header. Thus, the MN may receive non-encapsulated multicast data from the MAG, and therefore may not need to decapsulate the received packets to obtain the multicast content.

In the case of a handover, the MN may establish an interface with a second MAG, e.g. in a second wireless access network. The second MAG may then complete a PBU/PBA message exchange with the LMA, e.g. upon connecting to the other interface. The PBU message may be used to update a binding cache entry at the LMA, which may associate the MN-HoA with the second MAG instead of the first MAG. The LMA may re-associate the MN-HoA with the second MAG's Proxy-CoA. As such, the LMA may continue to act as the multicast router for the MN but may begin to send the multicast packets to the second MAG instead of the first MAG.

In an embodiment, the PMIP multicast method 200 may be used for a MN that is configured for IP version four (IPv4). The IPv4 stack enabled PMIPv6 protocol may provide IPv4 HoA mobility support for the MN, as described in the IETF document draft-ietf-netlmm-pmip6-ipv4-support-18, which is incorporated herein by reference as if reproduced in its entirety. Accordingly, the MAG may first obtain an IPv4 HoA from the MN. Subsequently, when the MN needs to join a multicast group to receive a multicast service, the MN may send an Internet Group Management Protocol version three (IGMPv3) membership report message to the MAG. The MN may indicate its HoA as the source address in the membership report message, since the IGMPv3 may require using an IP source address for the membership report message. The source address could be IPv4 link-local address configured according to RFC 3927. The MAG may then tunnel the Internet Group Management Protocol (IGMP) report membership message to the LMA, which may decapsulate the message and join the multicast group on behalf of the MN.

Figure 3:
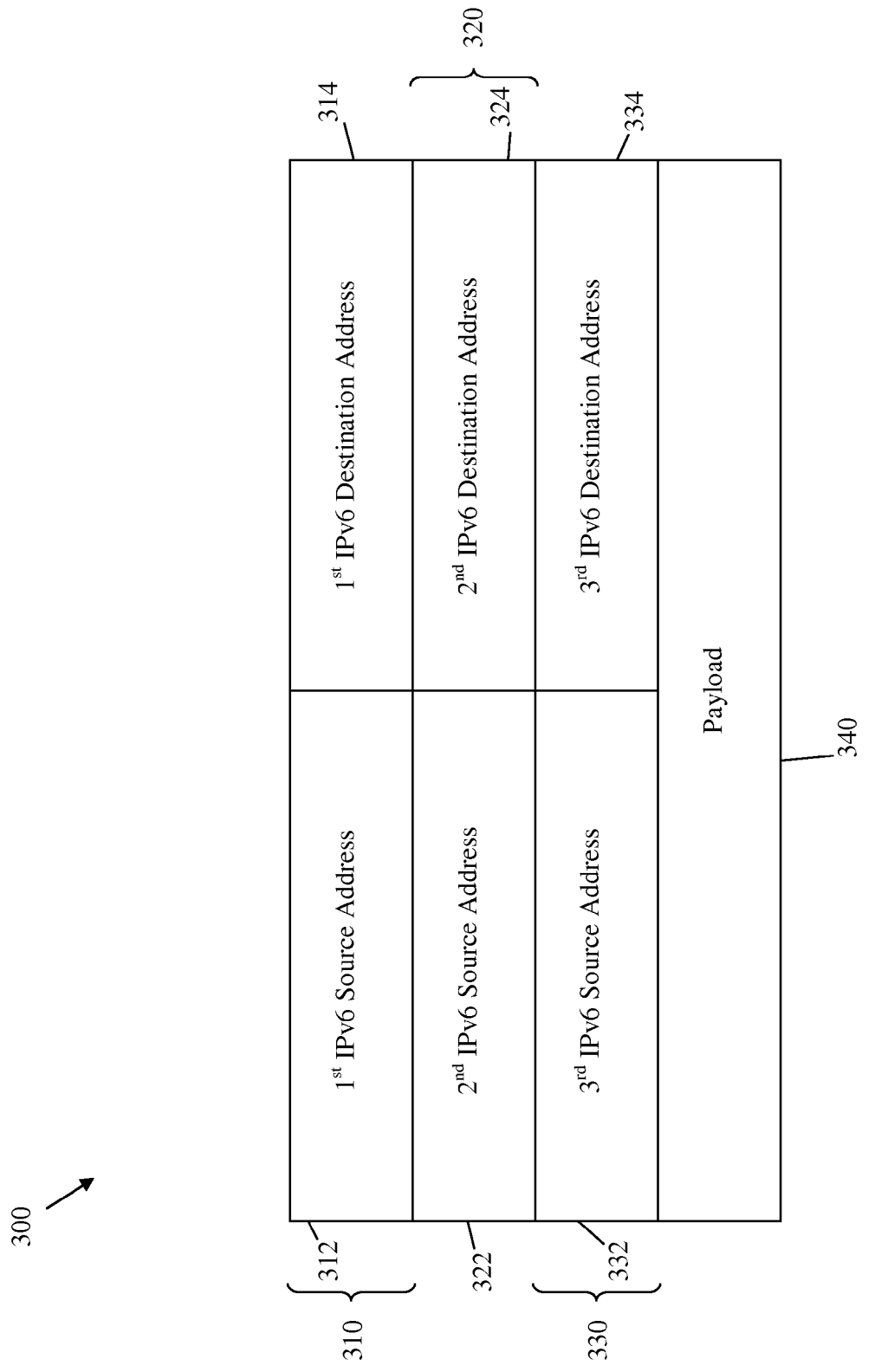
FIG. 3 is a schematic diagram of an embodiment of a PMIPv6 multicast packet.

FIG. 3 illustrates an embodiment of a PMIPv6 multicast packet 300 that may be forwarded from the LMA to the MAG associated with the MN. The PMIPv6 multicast packet 300 designated for the MN may be forwarded using the PMIP multicast method 200 as described above. The PMIPv6 multicast packet 300 may comprise a first header 310, a second header 320, a third header 330, and a payload 340. The first header 310 may be a tunnel (or outer) header and may comprise a first source address 312 that indicates the LMA and a first destination address 314 that indicates a Proxy-CoA for the MN, e.g. the MAG's IP address. The second header 320 may be a unicast (or inner) header and may comprise a second source address 322 that indicates the LMA and a second destination address 324 that indicates a HoA for one of the MNs, e.g. the MN subscribed to the multicast group. The third header 330 may be a multicast packet header and may comprise a third source address 332 that indicates a content provider (CP) and a third destination address 334 that indicates a multicast group. The source and destination addresses 312, 314, 322, 324, 332, and 334 may be IPv6 addresses. As such, the first header 310, the second header 320, and the third header 330 may be IP layer or Open System Interconnection (OSI) layer 3 headers. The payload 340 may be the multicast packet payload and may comprise upper layer protocols and/or the multicast content, such as the multicast service requested by the MN. The LMA may receive a multicast packet from an upstream router in the multicast group, which may comprise the third header 330 and the payload 340, and tunnel or encapsulate the multicast packet by adding the second header 320 and the first header 310 to the multicast packet. The LMA may then send the PMIPv6 (double-encapsulated) multicast packet 300 to the MAG.

Figure 4:
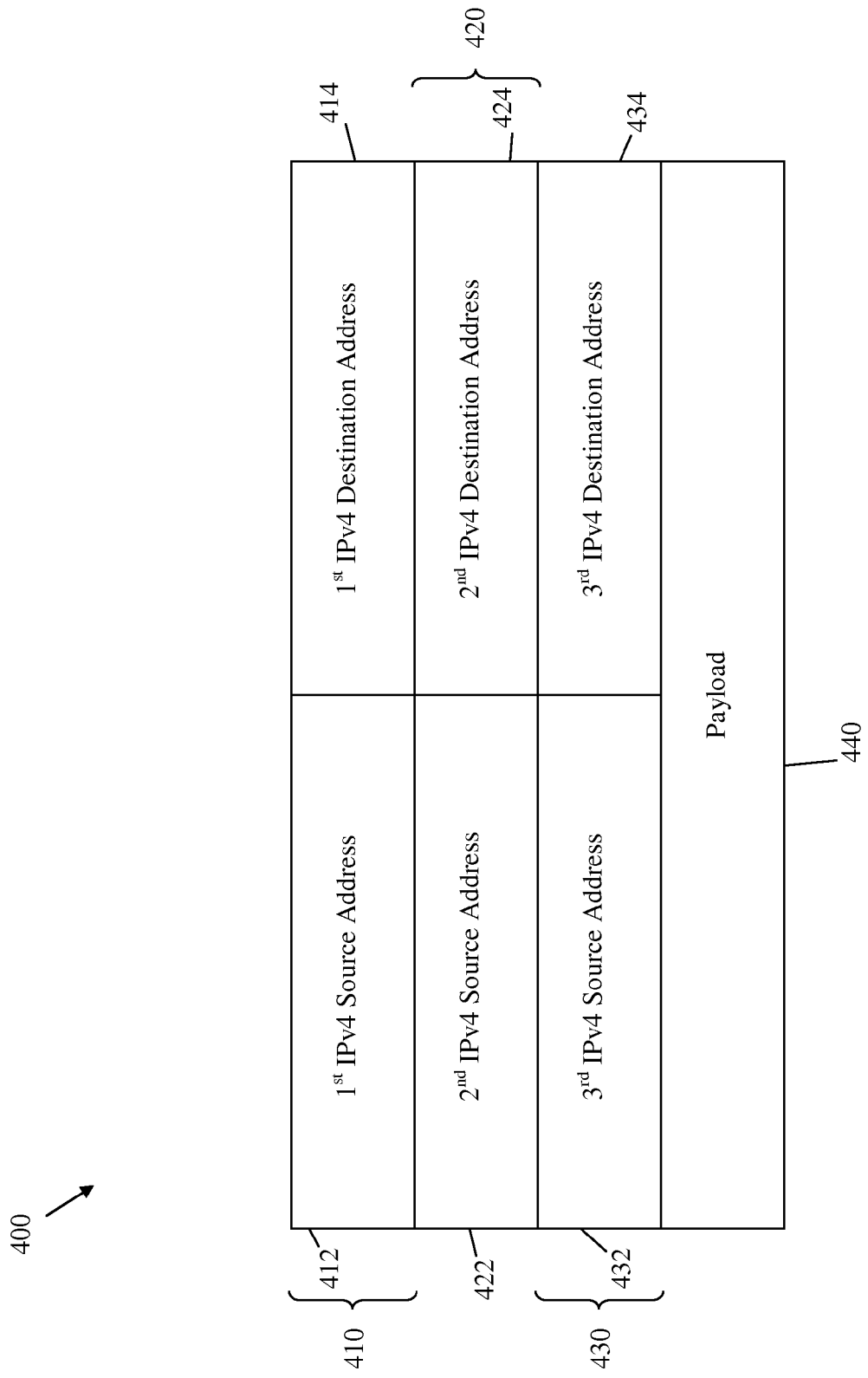
FIG. 4 is a schematic diagram of another embodiment of an IPv4 multicast packet.

FIG. 4 illustrates an embodiment of another IPv4 multicast packet 400 that may be forwarded from the LMA to the MAG associated with the MN. The IPv4 multicast packet 400 may be forwarded from the LMA to a designated MN, which may only be configured for IPv4. The IPv4 multicast packet 400 may comprise a first header 410, a second header 420, a third header 430, and a payload 440. The first header 410 may be a tunnel (or outer) header and may comprise a first IPv4 source address 412 that indicates the LMA and a first IPv4 destination address 414 that indicates the Proxy-CoA for the MN, e.g. the MAG's IPv4 address. The second header 420 may be a unicast (or inner) header and may comprise a second IPv4 source address 422 that indicates the LMA and a second IPv4 destination address 424 that indicates the MN-HoA for one of the MNs, e.g. the MN subscribed to the multicast group. The third header 430 may be a multicast packet header and may comprise a third IPv4 source address 432 that indicates a CP and a third IPv4 destination address 434 that indicates a multicast group. As such, the first header 410, the second header 420, and the third header 430 may be IP layer or layer 3 headers. The payload 440 may be the multicast packet payload and may comprise upper layer protocols and/or the multicast content.

In an embodiment, to provide multicast services for IPv4 enabled MNs, the LMA may initially send IGMP general queries to the MNs using a subnet multicast address, e.g. 224.0.0.1. The LMA may tunnel the general queries to each MN that has an IGMP multicast membership state. The tunneled multicast packets may be configured substantially similar to the IPv4 multicast packet 400. However, the third destination address 434 that indicates the multicast group may be set to the subnet multicast address, e.g. 224.0.0.1.

Figure 5:
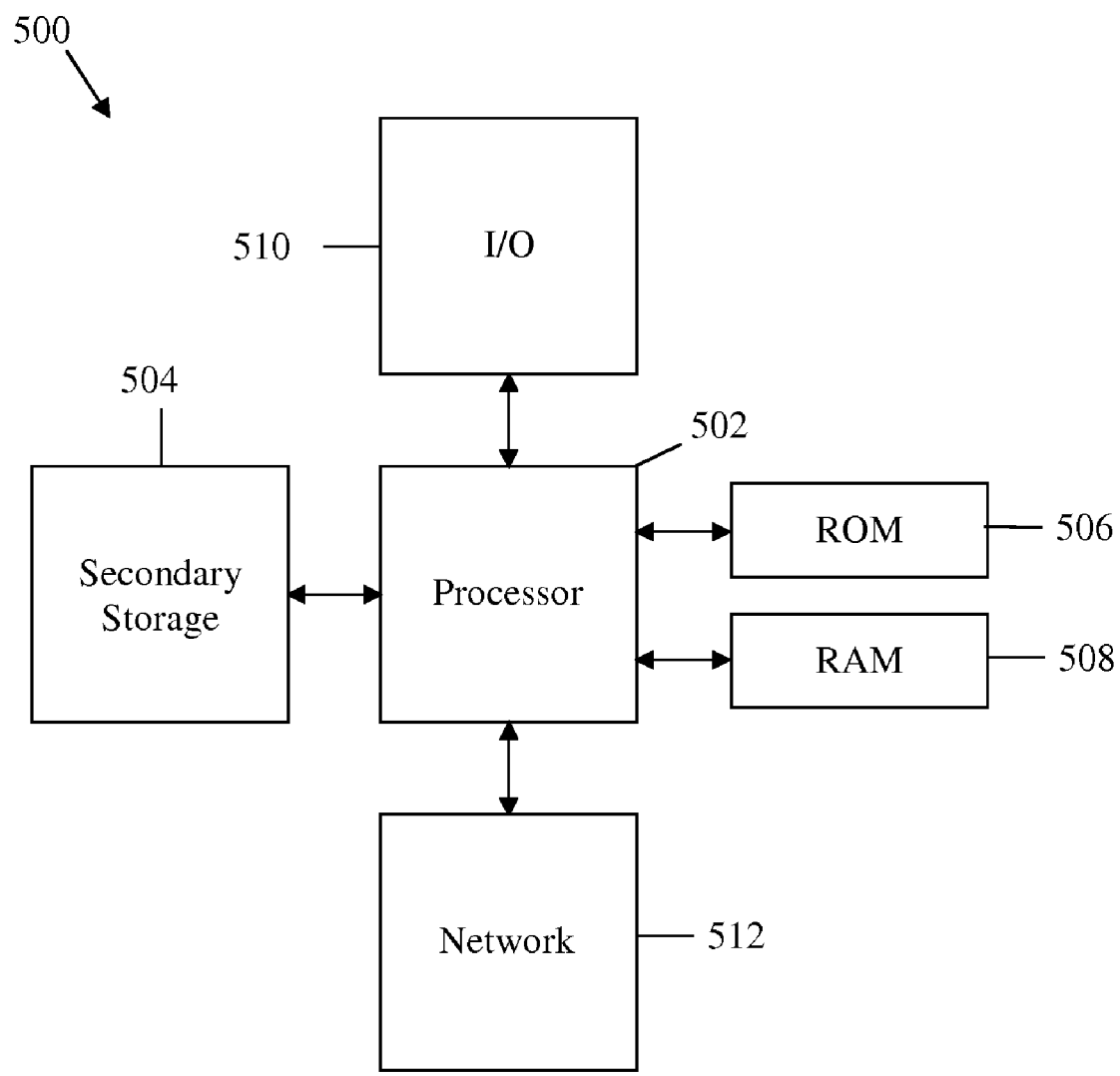
FIG. 5 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a mobile access gateway (MAG) configured to receive a tunneled multicast packet from a local mobility anchor (LMA), decapsulate the tunneled multicast packet, and forward the multicast packet to a mobile node (MN),
   wherein the MAG is not configured to perform multicast routing,
   wherein the tunneled multicast packet comprises a tunnel header and a unicast header, and
   wherein the LMA is configured to duplicate the multicast packet for a plurality of MNs, encapsulate each multicast packet with the unicast header associated with one of the MNs, and then encapsulate each multicast packet with the tunnel header associated with MAG.

2. The apparatus of claim 1, wherein the MN is unaware of the tunnel header or the unicast header.

3. The apparatus of claim 1, wherein the tunnel header has a proxy care-of-address (Proxy-CoA) for the MN as its destination address, and wherein the unicast header has a home address (HoA) for the MN as its destination address.

4. The apparatus of claim 1, wherein the MAG is configured to tunnel a request message from the MN to the LMA, wherein the request message indicates that the MN wants to join a multicast group.

5. The apparatus of claim 4, wherein the request message is a Mobile Listener Discovery version two (MLDv2) message that comprises an Internet Protocol version six (Ipv6) link-local address associated with the MN.

6. The apparatus of claim 4, wherein the request message is an Internet Group Management Protocol version three (IGMPv3) membership report message that comprises an Internet Protocol version four (Ipv4) home address associated with the MN.

7. The apparatus of claim 4, wherein the LMA is configured to connect to an upstream router in a multicast tree, thereby joining the multicast group on behalf of the MN.

8. The apparatus of claim 7, wherein the multicast tree does not change when the MN is handed over to a second MAG.

9. A network component comprising a local mobility anchor (LMA) configured to:
   receive a request message tunneled by a mobile access gateway (MAG) for a mobile node (MN), wherein the request message indicates that the MN wants to join a multicast group, and wherein the MAG is not configured to perform multicast routing;
   decapsulate the tunneled message;
   connect to a router for the multicast group;
   receive a multicast packet from the router; and
   send a tunneled multicast packet to the MN via the MAG, wherein the tunneled multicast packet has at least three Internet Protocol (IP) layer or layer 3 headers,
   wherein the tunneled multicast packet comprises a tunnel header and a unicast header, and
   wherein the LMA is configured to duplicate the multicast packet for a plurality of MNs, encapsulate each multicast packet with the unicast header associated with one of the MNs, and then encapsulate each multicast packet with the tunnel header associated with MAG.

10. The network component of claim 9, wherein the IP layer or layer 3 headers comprise a tunnel header, a unicast header, and a multicast header.

11. The network component of claim 9, wherein the LMA is further configured to:
    receive a proxy binding update (PBU) message from the MAG;
    establish a bi-directional tunnel with the MAG;
    receive the request message on the bi-directional tunnel;
    associate a home address (HoA) for the MN with the MAG; and
    send the tunneled multicast packet on the bi-directional tunnel.

12. The network component of claim 11, wherein the LMA is further configured to:
    receive a second PBU message from a second MAG;
    establish a second bi-directional tunnel with the second MAG;
    associate the HoA for the MN with the second MAG but not the first MAG; and
    send the tunneled multicast packet on the second bi-directional tunnel.

13. The network component of claim 11, wherein the LMA is further configured to:
    receive a second request message tunneled by the MAG for a second MN to join the multicast group;
    decapsulate the second tunneled request message to obtain a second home address (HoA) for the second MN;
    duplicate the multicast packet for the second MN;
    send a second tunneled multicast packet on the bi-directional tunnel; and
    include the second HoA in the second tunneled multicast packet to designate the second tunneled multicast packet for the second MN.

14. The network component of claim 9, wherein the LMA is further configured to:
    maintain a multicast listening state for tracking a plurality of multicast groups for a plurality of MNs; and
    exchange a plurality of query messages and report messages with the MNs to provide a plurality of multicast services for the MN.

15. The network component of claim 14, wherein the LMA is further configured to maintain a plurality of records comprising a plurality of addresses for the MNs and a multicast address that corresponds to a multicast group associated with the MNs.

16. A method implemented in a mobile access gateway (MAG), comprising:
    receiving a request message from a mobile node (MN) to join a multicast group;
    tunneling the request message to a local mobility anchor (LMA);
    receiving a tunneled multicast packet from the LMA that is destined for the MN;
    decapsulating the tunneled multicast packet to obtain a unicast packet comprising multicast content; and
    sending the multicast packet to the MN, wherein the MAG is not configured to perform multicast routing,
wherein the tunneled multicast packet comprises a tunnel header and a unicast header, and
wherein the LMA is configured to duplicate the multicast packet for a plurality of MNs, encapsulate each multicast packet with the unicast header associated with one of the MNs, and then encapsulate each multicast packet with the tunnel header associated with MAG.

17. A method comprising:
receiving a request message from a mobile node (MN) to join a multicast group;
tunneling the request message to a local mobility anchor (LMA);
receiving a tunneled multicast packet from the LMA that is destined for the MN;
decapsulating the tunneled multicast packet to obtain a unicast packet comprising multicast content; and
sending the multicast packet to the MN
wherein decapsulating the tunneled multicast packet comprises:
removing a tunnel header comprising a first source address that indicates the LMA and a first destination address that indicates a proxy care of address (Proxy-CoA); and
removing a unicast header comprising a second source address that indicates the LMA and a second destination address that indicates a MN home address (MN-HoA);
wherein the multicast packet comprises a multicast header comprising a third source address that indicates a content provider (CP) and a third destination address that indicates a multicast group.

18. The method of claim 17, wherein the third destination address that indicates the multicast group is an Internet Protocol version four (Ipv4) subnet multicast address.

* * * * *